United States Patent
Reichling et al.

(10) Patent No.: US 9,266,538 B2
(45) Date of Patent: Feb. 23, 2016

(54) PLATFORM DOOR SYSTEM, METHOD FOR OPERATING A PLATFORM DOOR SYSTEM AND DOOR FRAME FOR A PLATFORM DOOR SYSTEM

(71) Applicant: PINTSCH BAMAG ANTRIEBS-UND VERKEHRSTECHNIK GMBH, Dinslaken (DE)

(72) Inventors: Hans Ulrich Reichling, Erkelenz (DE); Günter Radczimanowski, Hünxe (DE)

(73) Assignee: PINTSCH BAMAG ANTRIEBS-UND VERKEHRSTECHNIK GMBH, Dinslaken (DE)

( * ) Notice: Subject to any disclaimer, the term of this patent is extended or adjusted under 35 U.S.C. 154(b) by 0 days.

(21) Appl. No.: 14/370,934

(22) PCT Filed: Jan. 9, 2013

(86) PCT No.: PCT/DE2013/100003
§ 371 (c)(1),
(2) Date: Jul. 7, 2014

(87) PCT Pub. No.: WO2013/104356
PCT Pub. Date: Jul. 18, 2013

(65) Prior Publication Data
US 2015/0040480 A1 Feb. 12, 2015

(30) Foreign Application Priority Data

Jan. 9, 2012 (DE) .................. 10 2012 100 124
Jan. 10, 2012 (DE) .................. 10 2012 100 159

(51) Int. Cl.
*B61B 1/02* (2006.01)
*B60J 5/06* (2006.01)
(Continued)

(52) U.S. Cl.
CPC . *B61B 1/02* (2013.01); *B60J 5/062* (2013.01); *E05F 15/00* (2013.01); *E05F 17/00* (2013.01); *E06B 3/4636* (2013.01); *E05F 2017/005* (2013.01); *E05Y 2900/404* (2013.01)

(58) Field of Classification Search
CPC ....... B61B 1/02; E06B 3/4636; E05F 17/002; E05F 2017/005; E05F 15/00; E05F 17/00; E04B 2/827; E05Y 2900/404
USPC .......... 49/380, 426; 52/207, 243.1; 104/27–31
See application file for complete search history.

(56) References Cited

U.S. PATENT DOCUMENTS 5,845,579 A * 12/1998 Langley ................ B61B 12/024
104/31
7,721,653 B1 * 5/2010 Burgess .......................... 104/28
(Continued)

FOREIGN PATENT DOCUMENTS

CA 2325044 A1 * 5/2002
DE 692 05 097 T2 11/1995
(Continued)

OTHER PUBLICATIONS

EPO machine translation of desciption of JP 200108889 dated Oct. 6, 2015.*
(Continued)

*Primary Examiner* — Katherine Mitchell
*Assistant Examiner* — Marcus Menezes
(74) *Attorney, Agent, or Firm* — Seed IP Law Group PLLC

(57) ABSTRACT

The invention relates to a platform door system comprising cover elements and sliding doors arranged along a platform for opening and closing passages between the cover elements, wherein the sliding doors when in a closed state are displaceable into different door positions along the platform, and wherein a given sliding door can then be opened and closed starting from a given door position into which the given sliding door has been displaced.

20 Claims, 3 Drawing Sheets

(51) Int. Cl.
*E05F 15/00* (2015.01)
*E05F 17/00* (2006.01)
*E06B 3/46* (2006.01)

(56) References Cited

U.S. PATENT DOCUMENTS

| | | | |
|---|---|---|---|
| 2005/0223933 A1* | 10/2005 | Crosbie et al. | 104/31 |
| 2008/0134930 A1* | 6/2008 | Drago | 105/436 |
| 2010/0180790 A1* | 7/2010 | Losito | 104/30 |
| 2010/0307063 A1* | 12/2010 | Bouthillier | E05D 15/063 49/425 |

FOREIGN PATENT DOCUMENTS

| | | | | |
|---|---|---|---|---|
| DE | 100 38 866 | A1 | | 2/2002 |
| DE | 10038866 | A1 * | 2/2002 | E05F 15/14 |
| DE | 102012101446 | A1 * | 7/2013 | |
| EP | 0 525 738 | B1 | | 9/1995 |
| EP | 2070800 | A2 * | 6/2009 | |
| EP | 2 500 225 | A1 | | 9/2012 |
| EP | 2500225 | A1 * | 9/2012 | |
| FR | 3002780 | A1 * | 9/2014 | |
| JP | 04325365 | A * | 11/1992 | |
| JP | 2000-108889 | A | | 4/2000 |
| JP | 2005-335451 | A | | 12/2005 |
| JP | 2006-008068 | A | | 1/2006 |
| WO | 2008/149246 | A1 | | 12/2008 |
| WO | 2011/027667 | A1 | | 3/2011 |
| WO | WO 2011058940 | A1 * | 5/2011 | |
| WO | 2011/069503 | A1 | | 6/2011 |
| WO | WO 2012101580 | A1 * | 8/2012 | |

OTHER PUBLICATIONS

Professional human translation of JP 2000108889 dated Jun. 2015.*
International Search Report (+English Translation), mailed May 8, 2013, for PCT/DE2013/100003, 6 pages.

* cited by examiner und DOOR FRAME FOR A PLATFORM
PLATFORM DOOR SYSTEM, METHOD FOR OPERATING A PLATFORM DOOR SYSTEM AND DOOR FRAME FOR A PLATFORM DOOR SYSTEM

TECHNICAL FIELD OF THE INVENTION

The invention relates to a platform door system with sliding doors arranged along the platform for opening and closing passages to a train standing at the platform. The invention also relates to a method for operating a platform door system and a door frame for platform door systems.

BACKGROUND OF THE INVENTION

Platform door systems that may be used to separate track areas from platform areas are becoming more and more important for a variety of reasons. Most importantly, their use can increase safety considerably, because they thus render the track area entirely inaccessible to travelers, who therefore cannot fall onto the tracks in front of arriving trains. Secondly, they also serve as an energy efficient way to ensure air conditioning of the platform area.

Simple platform door systems are aligned with certain train models, and include platform doors at fixed locations along the platform opposite which the train doors are expected to be positioned when the train is at a standstill.

Particularly when trains are controlled manually, it is not always possible to stop the train in exactly the required position, and consequently when the train has stopped the positions of the platform doors are not exactly opposite the locations of the train doors. If different trains are used, in which the doors are positioned differently, it often happens that the platform doors and the train doors are completely out of alignment.

Various attempts have already been made to solve the above problems, both from the point of view of the platform door systems, which are sometimes referred to as "full height" systems and may completely cover the platform as far as the track, and with platform guardrail systems, which are sometimes referred to as "half height" or "lower height" systems because they make use of a railing extending along the platform only at about waist height.

JP 2005 335451 A suggests a guardrail system with fence cases that are movable along the platform, the sliding fences being movable into and out of said cases to create or close passages between the movable fence cases. EP 2 500 225 A1 suggests an enhancement of this system, in which telescope-like fence elements extend out of the fence cases so that the spaces between each two adjacent movable fence cases that are closable by the sliding fences may be enlarged, and wider passages may be created between the fence cases. In both systems, the positions at which the passages to the trains can be created are modified by moving the fence cases. Both systems intentionally make use of only a single guardrail for the track, to ensure that the driver of the vehicle, for example, has an unobstructed view of the track. However, such systems cannot prevent people from falling over the guardrail and onto the track, or climbing over the railing. Furthermore, such systems do not allow the platform to be partitioned off from the track, which is often desirable for ventilation and air conditioning purposes. However, a particular drawback associated with these systems is that in order to modify the passages that can be created by the fences for a new train door configuration all parts of the guardrail, including the fence case, must be moved along the platform. However, experience has shown that it is precisely when platforms are overcrowded that people often lean on structures they believe to be fixed in place, which can result in accidents such as falling or getting hands or feet caught between elements. The risk of becoming caught in this way is greater when telescopic fence elements are used.

DE 692 05 097 T2 discloses a "full height" system, in which many sliding door panels are arranged side by side along the platform so as to form an almost unbroken closed surface in the closed state, similar to the surface formed by the train doors and the outer bodywork of the train. Then, depending on where the train doors are located when the train is stopped at the platform, a special opening mechanism moves certain of the sliding door panels out of the closed surface into a separate opening plane in which the selected sliding door panels can move. While this system allows any of a plurality of adjacent sliding door panels to open and form a passage, the places where the sliding door panels are located are determined in advance, so passages can only be created at predetermined, discrete locations. It is therefore not possible to match the passage created on the platform exactly with the positions of the train doors using this system.

Document WO 2008/149246 also suggests a "full height" platform door system comprising fixed posts and movable sliding door panels arranged along the platform, wherein the sliding door panels are of such a size that they each extend over slightly more than half of the area between the posts in the closed position, and wherein they extend in parallel planes slightly offset relative to each other and slightly overlap each other in the closed state. With this system, it is thus possible for passages to be created between the posts at various positions by opening the sliding door panels to different degrees. However, this system is associated with a number of problems that have proven to be extremely disadvantageous in practice. In order to prevent passengers from getting caught between the platform door and the train door, the train doors and the platform doors should be closed simultaneously. But since train doors, especially those used in mass transportation vehicles such as underground trains in large cities, where the use of platform door systems is most beneficial, usually open and close very quickly, the very large sliding door panels on the platform must also be moved and braked quickly. Since such door panels usually contain large areas of glass, a considerable weight must be accelerated and decelerated again with great precision, which is no simple matter. Because the door panels in this system are necessarily of considerable size, the panels when opening swing past the posts and into the area where the adjacent door panels are then moving in the opposite direction. This can lead to trapping of the fingers of the unmindful passengers who are leaning against or holding onto a sliding door as it opens. It has also proven difficult to detect a certain closed position between the two sliding door panels extending between the two parallel, slightly offset planes that form a passage.

DISCLOSURE OF THE INVENTION

The object of the invention is to describe a platform door system, particularly a "full height" platform door system, with which it is possible to adjust the passages formed by sliding doors exactly to different train door positions and still avoid the problems of the prior art outlined in the preceding.

This object is solved with a platform door system having the features of claim 1. The coordinate claims relate to a movable door frame for platform door systems and a method for controlling a platform door system. Advantageous variants and refinements are object of the subordinate claims.

The invention is based on the idea of being able to move individual sliding doors in the closed state along a platform independently of each other in such manner that the passages that are opened up by the sliding doors are located exactly at the positions where the entrances to a waiting train are located. Thus, passages are not formed by openings of lesser or greater width between very wide sliding doors and fixed posts, but entire sliding doors are initially moved in the closed state to the places where passages are needed, and only then are the doors opened.

To implement this idea, the invention makes use of displaceable sliding doors and cover elements, which cover the gaps between adjacent sliding doors, so that adjacent sliding doors are able to move toward or away from one another without thereby opening a gap down to the track. This enables the individual sliding door panels to be made smaller and lighter.

With a sliding door according to the invention, a passage may be formed between two sliding door panels which move toward one another when closing, or by one sliding door panel and a "movable wall element", wherein the two sliding door panels or the sliding door panel and the movable wall element are movable to a new position together in the closed state. The movable wall element is called the movable wall element, because it is movable together with the sliding door panel when the sliding door is to be realigned with respect to a train, although it is stationary when the sliding door panel is opening or closing. Moreover, a sliding door according to the invention may also comprise additional movable wall elements, thereby enabling such a door to cover a larger span between two wall elements, and at the same time only the one of more relatively lightweight sliding door panels have to be moved during opening of the door, as will be explained in greater detail in the following.

In such a sliding door, the two sliding door panels or the one sliding door panel and the movable wall element are preferably located in the same plane, which makes it easier to detect a certain closed position.

The cover elements may be designed as permanently or temporarily (that is to say, at least while the sliding doors are being opened) stationary wall elements, and they advantageously fulfill several functions. They can cover the areas between adjacent sliding doors, and can easily be designed to be distinct from the sliding doors, so that individuals on the platform are easily able to identify which parts of the platform door system might move when the doors are opened and closed, and which will remain stationary, thus increasing security. In particular, cover elements in the form of fixed wall elements enable mounting of roof or ceiling connection elements as well, which overlay the area between the cover elements toward a roof or ceiling over the platform and above the sliding doors, so that when the sliding doors are closed the platform can be partitioned off from the track, and optionally from the environment, in energy efficient manner. The cover elements are preferably arranged in front of the plane of movement of the sliding doors when viewed from platform, as this prevents any danger that a person on the platform might be trapped between two sliding doors moving toward one another when two adjacent sliding doors are being repositioned.

In a preferred embodiment, one movable wall element is assigned to at least certain sliding door panels, and is movable together with the respective sliding door panel in the closed state along the platform into a door position. In this way, it is then possible to partition off a relatively large area between the cover elements, and at the same time to keep the sliding door panel that is actually to be opened to create a passage relatively compact, with the result that the sliding door panels easily be moved and decelerated quickly during opening and closing. The repositioning of the doors, which are then formed by sliding door panels and movable wall elements, may take place slowly, since the position of the train doors can normally be communicated to a corresponding door controller before the train arrives. In the currently preferred embodiment, a sliding door is made up of two sliding door panels, which move in opposite directions in a common plane for opening and closing, and two movable wall elements, which are located on the left and right of the two sliding door panels.

The movable wall elements and the sliding door panels may each have a dedicated mounting, so that they can be moved into a new position with the sliding doors in the closed state. Preferably, however, a movable door frame is provided in which at least one sliding door panel and one wall element are disposed, and within which the sliding door panel is movable for opening and closing a passage.

A passage may be formed by two sliding door panels moving in opposite directions, or by a single sliding door panel extending from a movable wall element (which does not move when the sliding door panel is opening). In the latter case, the sliding door panel and the movable wall element are preferably located in a common plane, so that the sliding door panel and the movable wall element are aligned flush with one another in the closed position, making it easier to detect a certain closed position. If the passage is formed by two sliding door panels, these are advantageously also arranged such that they are aligned flush with one another in the closed state. The movable wall elements that are not used for the optional formation of a passage are advantageously arranged in such a way that the sliding door panels move on the side of the movable wall elements closest to the track during opening, so that the risk of people being caught is further reduced, since the moving expanse of the sliding doors facing the people on the platform becomes smaller as the doors open more widely. The sliding doors thus extend between the movable wall elements (which are however stationary while the doors are opening) and the outside of a standing train.

Further details and advantages of the invention will be apparent from the following purely exemplary, non-limiting description of an embodiment in conjunction with the drawing.

DESCRIPTION OF PREFERRED EMBODIMENTS

Figure 1:
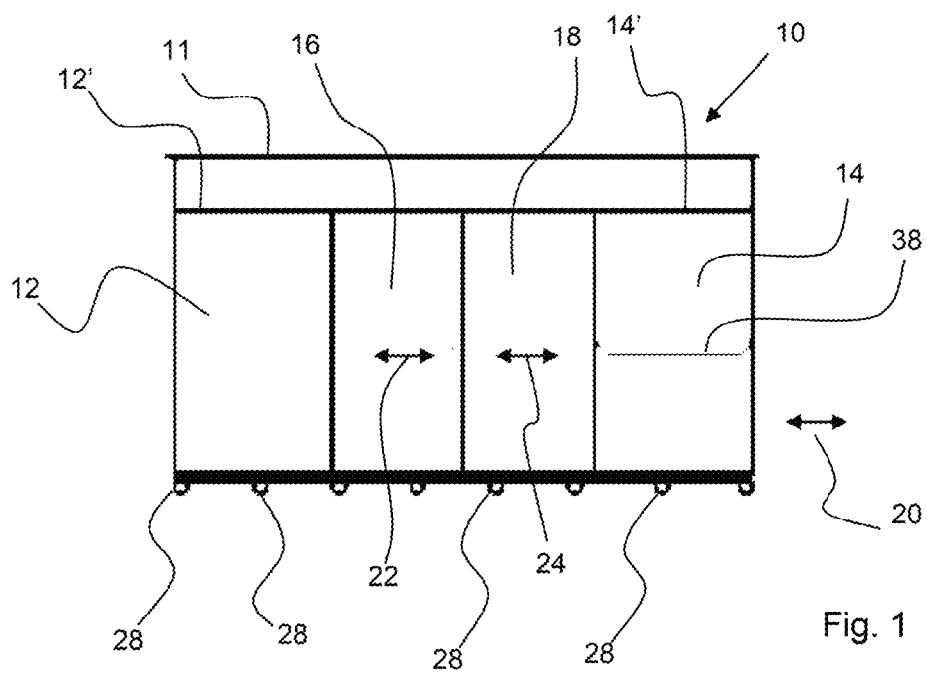
FIG. 1 shows a schematic representation of a movable sliding door for platform door systems according to the invention (as viewed either from a platform while facing a track or from the track while facing the platform), having two sliding door panels with assigned wall elements arranged in a door frame, wherein the sliding door panels are in the closed position.
Figure 2:
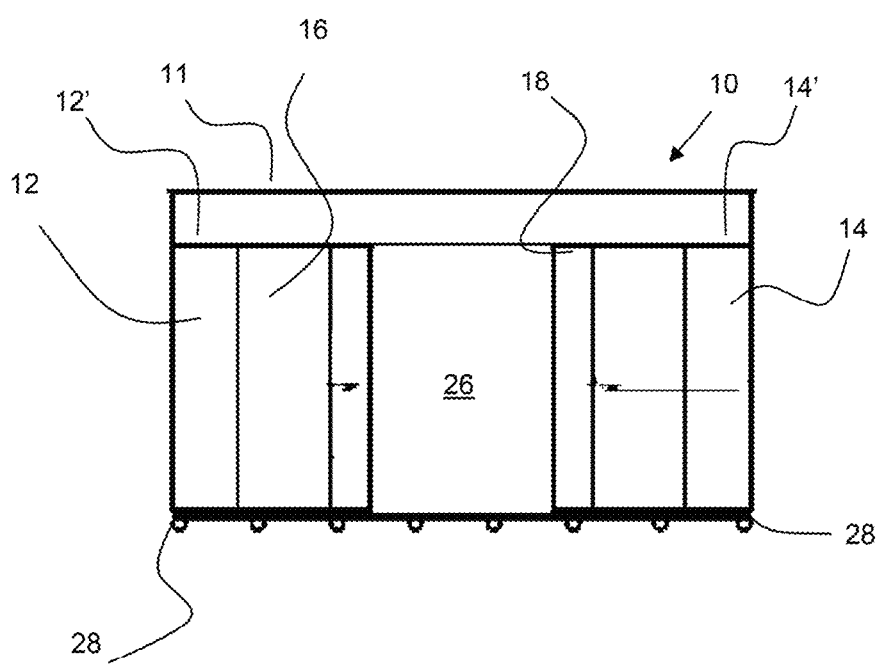
FIG. 2 shows the schematically represented sliding door of FIG. 1, wherein the two sliding door panels are in the open position (as viewed either from a platform while facing a track or from the track while facing the platform).

A sliding door is shown in both of FIGS. 1 and 2, designated as a whole with 10 and formed in this embodiment by a door frame 11 having two wall elements 12, 14 and two sliding door panels 16, 18.

As indicated by motion arrow 20, sliding door 10 may be moved in its entirety along a platform not shown here, and in the embodiment shown by moving door frame 11, in order to bring sliding door panels 16, 18 in the closed state into various door positions along the platform, starting from which they can then be opened and closed, wherein said repositioning of sliding door 10 may be performed within the range of movement thereof independently of other sliding doors arranged along the same platform.

Figure 4:
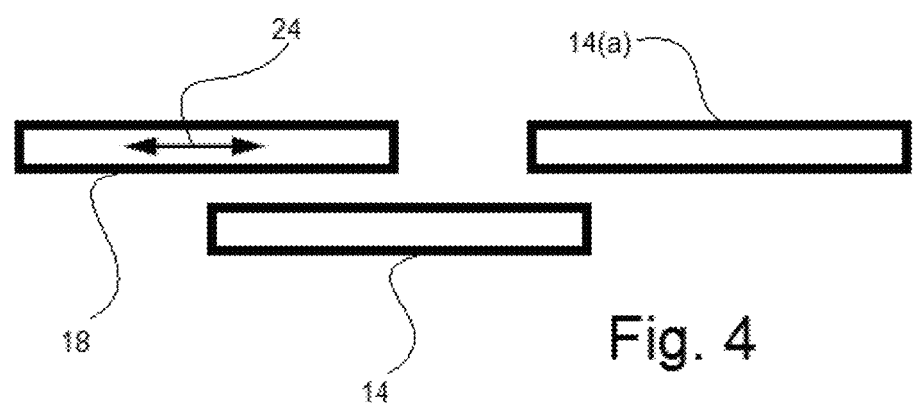
FIG. 4 shows a cross-section of a movable sliding door and two movable wall elements, wherein the cross-section is in a plane parallel with a platform.

Since wall elements 12, 14 are also moved when door frame 11 is moved, they are described as movable wall elements for the purpose of the invention, and in this embodiment exactly one movable wall element 12, 14 is assigned to each sliding door panel 16, 18. It should be noted at this point two movable wall elements such as movable wall elements 14, 14(a) in FIG. 4 may also be assigned to each sliding door panel, in which case one movable wall element 14(a) of each pair is preferably arranged in the plane in which the sliding door panel such as sliding door panel 18 moves during opening and closing of the passage, whereas the other movable wall element 14 is arranged such that it at least partially covers a door panel such as door panel 18 during opening toward the platform. Then, only one sliding door panel 18 is moved to open up a passage, which panel preferably moves against the wall element 14 in the same plane of movement when closing, thereby enabling simple detection of a defined closed position. A passage such as in the embodiment shown is preferably formed by two sliding door panels 16 and 18, each of which open and close in opposite directions, wherein advantageously both sliding door panels move in the same plane during opening and closing, that is to say toward one another when closing, which also enables the desired safe, simple detection of a defined closed position.

In door frame 11, sliding door panels 16, 18 may be moved for in the directions indicated by motion arrows 22 and 24 to open and close a passage 26, for which purpose corresponding automated drive means are provided. In this way, sliding door panels 16, 18 are opened and closed, that is to say passage 26 is freed or blocked, preferably in synchronization with the opening and closing of the doors of a train standing at the platform, and only after any movement of door frame 11 for positioning the sliding door panels relative to the train doors has been completed. The principles disclosed in WO 2011/069 503 A1 have proven particularly effective with regard to the synchronous opening and closing of train doors and platform doors. However, it is also possible to use other techniques, such as camera surveillance with preferably automated image analysis and/or sensors in the area of the sliding doors, to ensure that the sliding door panels only open when corresponding train doors are positioned behind them, and to guarantee that opening and closing take place synchronously. In older railway equipment, provision may be made for the platform door system to be operated manually by personnel on the train and/or the platform.

An emergency release mechanism may advantageously be provided, which allows sliding door panels 16 and 18 and/or movable wall elements 12 and 14 to be opened manually as well, wherein such an emergency release mechanism may be designed so that the sliding door panels may only be opened by authorized personnel on the platform side, but by anyone on the track side, both to prevent abuse and accidents and to make it possible for persons on the track to leave the area at any time. In FIG. 1, a conventional emergency release clip 38 is indicated on movable wall member 14. Similar emergency release mechanisms may also be provided on at least certain of the following cover elements and/or at least certain of the movable wall elements, which will be described below with reference to FIG. 3. In the example shown, movable wall element 14 is constructed as an emergency door and is able to swing open after it has been released.

In this embodiment, door frame 11 is supported on rollers 28, only some of which are designated with reference signs for the sake of clarity, so that the frame can be moved along the platform. Sliding door panels 16, 18 are suspended inside door frame 11, and the bottoms thereof are guided for example by guide elements in the form of cams, which can slide in a guide groove along the door frame and thus also along the platform in a guide channel. The guide channel is advantageously open at the bottom so that any dirt can fall through and does not affect the running of the door panels.

Figure 3:
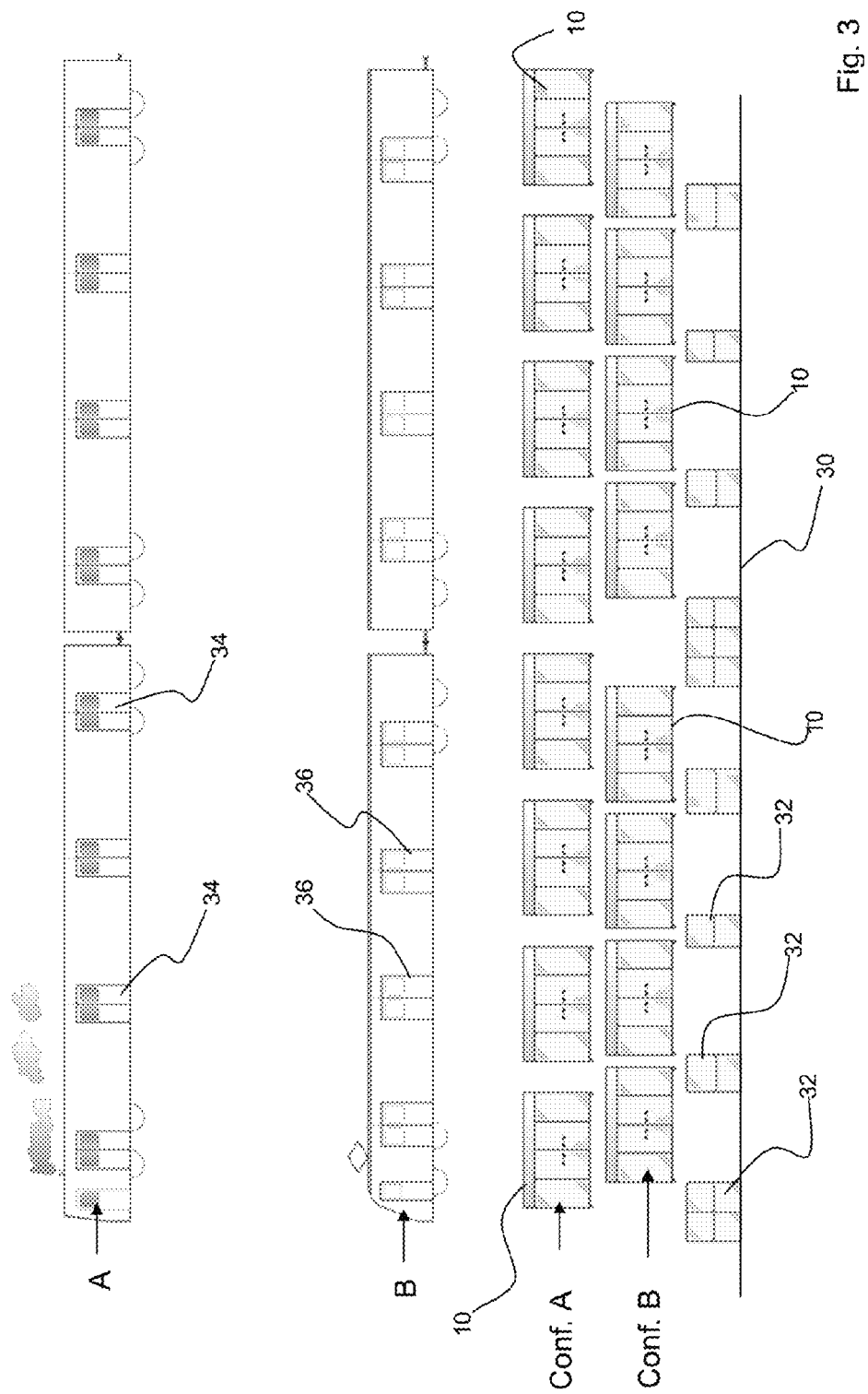
FIG. 3 is a schematic representation of the operation of the invention.

FIG. 3 is a diagram illustrating the function of the invention. Cover elements 32 in the form of fixed wall elements are arranged along a platform 30 at positions where no train doors will normally come to a halt even with different trains, such cover elements being of different widths in this embodiment, and only some of which have been designated with reference signs for the sake of clarity. Cover elements 32 in this case are each in the form of emergency doors, so that they can be swung out from the track to the platform if necessary. It should be noted at this point that the cover elements do not have to be permanently fixed. The cover elements are not usually moved when the sliding doors are repositioned to adapt the passages to the doors of an arriving or stationary train, and they advantageously serve to support additional elements such as particularly roof and/or ceiling connection elements, which then make it possible to partition the platform off completely from the track. However, the cover elements may also be mobile to such a degree that they may be offset easily to enable the system to be retooled in the event of a change of train models, for example. If particularly high flexibility of the platform door system is required in terms of adaptability to different train door positions, the cover elements may also be designed so as to be movable automatically.

In addition, in this embodiment a total of eight displaceable sliding doors 10 are provided, only some of which are identified with reference signs, and which are movable along platform 30, wherein they are each covered partially and to differing degrees in the region of the movable wall elements by cover elements 32.

In this embodiment, each sliding door is formed by movable door frame as described above. By way of a purely exemplary explanation of two different arrangement configurations of the eight sliding doors 10 relative to the cover elements 32, designated Conf. A and Conf. B in the drawing, the sliding doors are not shown level with the platform 30 on which they are actually standing, but suspended above the platform, as it were. Thus, the bottom level of the drawing shows cover elements 32, in this case in the form of fixed wall elements, which are in the front plane when viewed from the platform, and in the two drawing levels above this, two different positions of the eight sliding doors which are in fact located in a plane directly behind the fixed elements when viewed from the platform. Finally, two trains A and B are shown in the two topmost drawing levels (again only partially provided with reference signs), wherein each train has eight train doors 34 and 36, each consisting in this example of two sliding door panels, although in this case the distances between the individual doors on each train are different.

The sliding door panels can then be brought into both illustrated configurations, Conf. A and Conf. B, as well as others, by moving the door frames individually, so that the passages are created by the opening of the respective door panels at the locations where train doors 34 and 36 are located when a train A and/or B has/have come to a standstill.

In order to control such a platform door system, a procedure is preferably implemented whereby information about the positions of the opening doors on the train is transmitted automatically to the platform door system via suitable signaling equipment before or as the train approaches the platform, and the platform door system then moves the sliding door panels in the closed condition such that the passages that are made available by the opening of the sliding door panels correspond with the expected positions of the train doors. Depending on the capabilities of the signaling equipment implemented in accordance with the wishes of the customer, other information above and beyond the data to enable corresponding positioning of the sliding door panels may be transmitted to the platform door system even before the train reaches the platform, e.g., data about faulty doors, so that passengers waiting on the platform may be advised in advance that certain doors will not open.

The actual door positions on the arriving train may be verified automatically, preferably after the train has stopped and before the sliding door panels are opened, to ensure that the expected positions of the train doors correspond with the sliding door panels, such a verification may particularly be performed by sensors in the area of the sliding door panels and/or by camera monitoring of the area of the sliding door panels. If such signaling equipment is missing in older trains, a manual control may be provided, which for example enables the driver of an arriving train or the platform personnel to control the platform door system manually or semi-automatically.

Many variations and refinements are possible within the scope of the inventive idea, relating for example to the manner in which the sliding door panels and assigned movable wall elements are repositioned. Thus, for example, instead of the displaceable door frames shown, it is possible to provide each movable wall element assigned to a sliding door panel with its own mounting (e.g., the example dedicated mountings 12' and 14' in FIGS. 1 and 2) to enable simultaneous displacement together with the assigned sliding door panel. It is also possible to construct the movable sliding doors and/or cover elements so that they are only waist-high. It is advantageously also possible to install the invention by retrofitting or upgrading existing platform door systems, in which cases the displaceable door frames have proven particularly beneficial with regard to time- and cost-effective upgrading.

LIST OF REFERENCE SIGNS

10 Sliding door
11 Door frame
12, 14 Movable wall elements
16, 18 Sliding door panels
20, 22, 24 Motion arrows
26 Passage
28 Rollers
30 Platform
32 Cover
34, 36 Train doors
38 Emergency release clip
A, B Trains

The invention claimed is:

1. A platform door system, comprising
cover elements arranged along a platform and
sliding door units arranged along said platform in non-coplanar relation to the cover elements each sliding door unit having at least one sliding door panel which is operable to selectively allow or block access to passages between said cover elements,
wherein the sliding door units each have a closed state in which access to a passage is blocked and an open state in which access to a passage is allowed,
wherein the cover elements cover gaps between adjacent sliding door units, and
wherein the sliding door units, each in the closed state, are movable along the platform independently of the cover elements to different door positions,
wherein the sliding door panels of said sliding door units are selectively openable or closable to allow and to block access to passages, respectively.

2. The platform door system according to claim 1, wherein at least certain cover elements are constructed as fixed position wall elements.

3. The platform door system according to claim 1, wherein the cover elements, when viewed from the platform, are arranged in front of a plane in which the movable sliding door units can be moved in the closed state.

4. The platform door system according to claim 1, wherein at least some of the sliding door panels are each operatively associated with at least one respective movable wall element to move with the at least one respective movable wall element to a new door position along the platform together with the respective sliding door panel in the closed state.

5. The platform door system according to claim 4, wherein each sliding door panel to which a movable wall element is assigned is arranged such that upon opening of the sliding door panel the sliding door panel moves along a side of the movable wall element farthest from the platform.

6. The platform door system according to claim 4, wherein each movable wall element assigned to a sliding door panel is equipped with a dedicated mounting designed to move a respective movable wall element equipped with the dedicated mounting simultaneously with the assigned sliding door panel in the closed state.

7. The platform door system according to claim 4, wherein at least some of the movable wall elements are emergency doors, which can be opened manually.

8. The platform door system according to claim 4, wherein at least one sliding door panel and at least one movable wall element adjacent thereto are arranged in a common displaceable door frame, which is used to move the sliding door panel and the assigned movable wall element together, and within which the sliding door panel is movable for opening and closing a passage.

9. The platform door system according to claim 8, wherein two sliding door panels, movable in opposite directions, and two movable wall elements are arranged inside the displaceable door frame for opening and closing a respective passage, wherein the sliding door panels are movable in a same plane to open and close the respective passage.

10. The platform door system according to claim 4, wherein two movable wall elements are assigned to each sliding door panel, wherein one of the two movable wall elements is arranged such that the sliding door panel travels along a side of one of the two movable wall elements farthest from the platform during opening, and wherein the other of the two movable wall elements is arranged in a plane in which the sliding door panel moves when opening and closing a respective one of the passages.

11. The platform door system according to claim 1, wherein each sliding door comprises two sliding door panels that open and close in opposing directions, wherein the two sliding door panels both move in the same plane during opening and closing.

12. The platform door system according to claim 1, wherein at least some of the cover elements are emergency doors that can be opened manually.

13. The platform door system according to claim 1, wherein at least some of the sliding door panels are emergency doors that can be opened manually.

14. The platform door system according to claim 1, said system being a full height system, which partitions the platform off from a track at least up to an average head height.

15. A platform door system, comprising:
- at least two door frames sequentially arranged movably along a platform;
- a cover element arranged along the platform in non-coplanar relationship with the door frames, where the cover element covers at least one gap between sequential door frames; and
- at least one sliding door panel arranged in at least a first door frame of the at least two door frames, said at least one sliding door panel being displaceable inside at least the first door frame such that the at least one sliding door panel has a closed state in which a passage is closed and an open state in which the passage is open,
- wherein the at least two door frames are movable along the platform independently of the cover element to different door positions.

16. The system according to claim 15, further comprising:
- at least one wall element, the at least one wall element arranged inside one of the door frames.

17. The system according to claim 16, wherein two door panels and two wall elements are arranged inside the first door frame.

18. The system according to claim 16, wherein the at least one sliding door panel moves along a side of a wall element farthest from the platform during opening.

19. A method for controlling the platform door system according to claim 1, comprising:
- determining one or more door positions of a train along said platform; and
- moving at least one sliding door unit in the closed state to align with one of the one or more door positions of the train such that at least one passage between the train and platform is opened by opening the at least one sliding door panel of the at least one sliding door unit.

20. The method according to claim 19, wherein a check is automatically carried out after the train has reached a platform and before the at least one sliding door panel is opened to determine whether the door positions of the train match the door positions of the train, by sensors in a region of the sliding door panels or by camera monitoring of an area of the sliding door panels.

* * * * *